Oct. 22, 1963  L. E. CURRISTON  3,107,540
GYROSCOPE PICKOFF AND TORQUER
Filed Dec. 4, 1961  2 Sheets-Sheet 1

INVENTOR.
LOREN E. CURRISTON.
BY
*Raymond A. Paquin*
ATTORNEY.

Oct. 22, 1963 — L. E. CURRISTON — 3,107,540
GYROSCOPE PICKOFF AND TORQUER
Filed Dec. 4, 1961 — 2 Sheets-Sheet 2

INVENTOR.
LOREN E. CURRISTON
BY Raymond A. Paquin
ATTORNEY.

United States Patent Office 3,107,540
Patented Oct. 22, 1963

3,107,540
GYROSCOPE PICKOFF AND TORQUER
Loren E. Curriston, Syosset, N.Y., assignor to American Bosch Arma Corporation, a corporation of New York
Filed Dec. 4, 1961, Ser. No. 156,611
12 Claims. (Cl. 74—5.4)

The present invention relates to gyroscopes and has particular reference to pickoff windings and torquing means therefor.

In a gyroscope having a flywheel supported by a single bearing which permits universal motion of the flywheel, such as a spherical fluid bearing, for example, some difficulty has been encountered in selecting suitable pickoff deivces to detect tilt of the wheel with respect to the support and to apply correcting torques to the flywheel. The selection has been more or less confined to a choice between optical pickoffs and capacitive pickoffs neither one of which is completely satisfactory, with additional capacitive or pneumatic torquing means.

In a preferred embodiment of the present invention pickoff windings are wound on the same static structure that carries the main motor windings which are used to drive the free rotor wheel. The pickoff windings are extra coils which are placed side by side in pairs on certain special poles, notched to receive the pickoff coils. Four pairs of pickoff coils are placed at 90° intervals about the periphery of the stator structure, and opposing pairs are connected together to eliminate the effect of rotor translation and to isolate the effect of rotational displacement. Of particular advantage is the fact that no extra electrical power is required for the signal generation, since the main motor flux provides the alternating magnetic flux for sensing purposes as well as for driving the rotor. Also, no extra component parts or electrical connections are required on the gyro rotor to accomplish the present invention.

Another advantage lies in the possibility of using the pickoff coils or similar additional coils for rotor torquing by interaction of magnetic fluxes which are produced by energizing the pickoff windings with the magnetic flux produced by the motor windings. Either A.C. or D.C. torquing can be effected as desired. Any particular embodiment may utilize the pickoff function above, or the torquer function above, or a combination of both, functions simultaneously.

For a more complete understanding of the invention reference may be had to the accompanying diagrams in which FIGURE 1 is an interior side view of a preferred embodiment of the invention;

Figure 1:
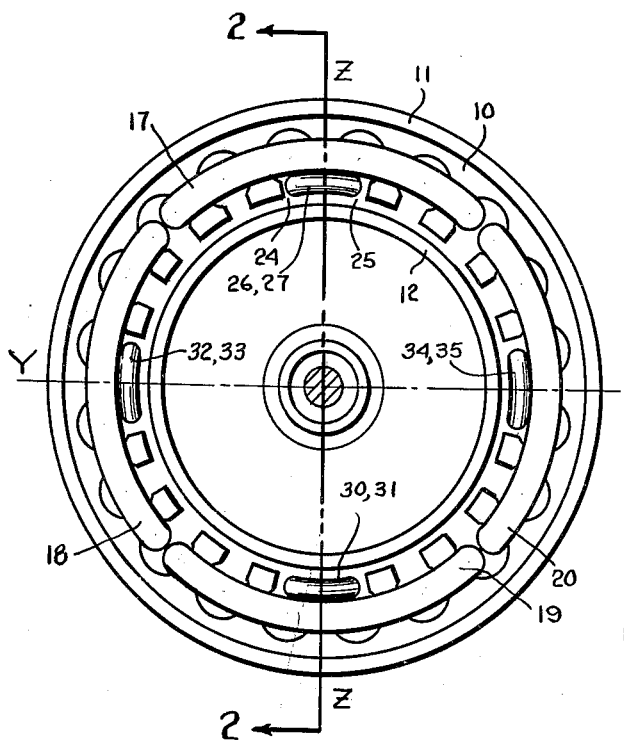

Referring now to the example shown in FIG. 1, a laminated punched stator core 10 is securely held in a frame 11. A rotor wheel 12 is supported within the stator 10 on a three degree of freedom bearing 13 such as that exemplified by a spherical fluid bearing. In the figure, the spherical bearing surface is formed on a shaft 14 which is secured to end plates 15, and pressurized air is supplied to the gap between the bearing surface and the rotor wheel from an air source 16 through interconnecting passageways in the shaft 14. Other types of self aligning suspension means may be used to support the rotor, if desired, such as ball bearings, for example.

Electrical coils 17, 18, 19, 20 are wound in the slots in the stator core 10 and when energized by an alternating voltage provide the rotating magnetic field for driving the wheel 12.

In normal gyroscopic operation, it is of course necessary to sense the direction and degree of angular displacement between the stator assembly and the rotor 12 about the perpendicular axes YY and ZZ. In accordance with this invention, the core 10 is provided with notches or recesses 21 at the central plane of the core 10. One pair of magnetic fingers 22, 23 thus formed by the recess 21 and adjacent slots 24, 25 in core 10 are wound with pickoff coils 26, 27. A second pair of magnetic fingers 28, 29 directly opposite the first pair are wound with pickoff coils 30, 31. Pickoff coils 32, 33 on the left in FIGURE 1 and pickoff coils 34, 35 on the right in FIGURE 1 are similarly wound on the stator core 10, midway between the coils 26, 27 and coils 30, 31, i.e., ninety degrees away from either will set.

Figure 2:
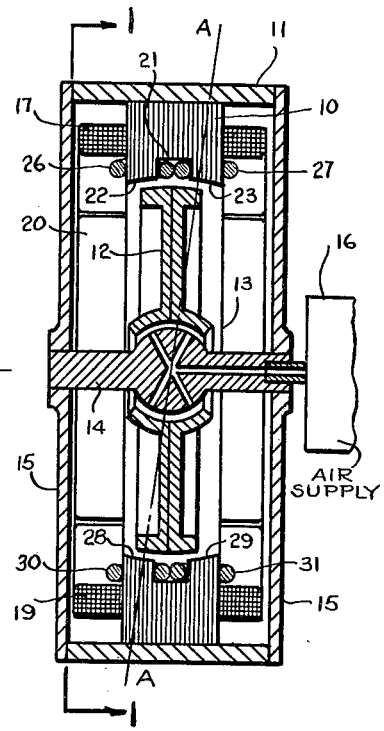
FIGURE 2 is a cross-sectional view through 2—2 of FIG. 1.

With special attention to FIGURE 2, it will be seen that when the rotor 12 is centered within core 10 or recess 21, the magnetic flux from coil 17 is equally divided between coils 26 and 27 and the voltage induced in each of the coils 26, 27 is the same. If the rotor 12 is tilted about the Y—Y axis to the position of line A—A the magnetic flux from winding 17 will be stronger through coil 27 and weaker through coil 26 as the reluctance of the path between the finger 23 and rotor 12 is decreased while the relutance of the path between the finger 22 and rotor 12 is increased. Thus, the voltage induced in winding 27 is greater than that induced in winding 26 and the difference voltage is an indication of the position of the rim of rotor 12 with respect to the recess 21. To get a true measure of angular tilt, the diametrically opposite coils 30, 31 are connected in series with coils 26, 27. The sum of the difference voltages in the windings 26, 27 and 30, 31 is an indication of tilt only since translational displacements of the rotor induces opposite outputs in the two sets of windings resulting in a net output of zero.

Figure 3:
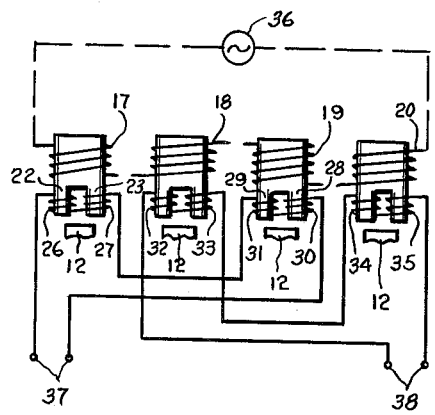
FIGURE 3 is a wiring schematic of the gyroscope in FIGS. 1 and 2.

FIGURE 3 illustrates schematically the wiring between the various coils of FIGS. 1 and 2. Thus, the motor coils 17, 18, 19, 20 are connected across the alternating voltage supply 36 in a manner unspecified here but in any manner known to the art so as to produce the rotating magnetic flux in the stator. Windings 26, 27, 30 and 31 are connected in series across terminals 37. Windings 32, 33, 34, and 35 are connected in series across terminals 38 in a fashion similar to windings 26, 27, 30 and 31 whereby the signal at terminals 38 will be indicative of the tilt of rotor 12 with respect to core 10 about the axis ZZ in FIG. 1, while translational displacement of rotor 12 will not disturb the angular indication. It should be realized that the schematically represented windings 17–20 are actually part of the regular multiplephase motor drive windings connected to the motive power in the usual manner, and are not special pickoff energizing windings.

In order to implement this embodiment of the invention, it is convenient to provide a number of motor poles which is divisible by four, so that the pickoff coils, which are exactly ninety degrees apart in the stator assembly, will always be centered at one of the poles. However, it is not a necessary condition for this invention since the motor flux can be generated as a rotating space wave in a number of ways, as, for example, by a three phase motor winding and three phase excitation.

In further detail of the structure described, the recess 21 in core 10 may encircle the entire core 10, or may be confined only to the four positions where the pickoff coils are to be located. The pickoff coils may extend over several slots rather than being limited to adjacent slots as illustrated in FIG. 1.

Figure 4:
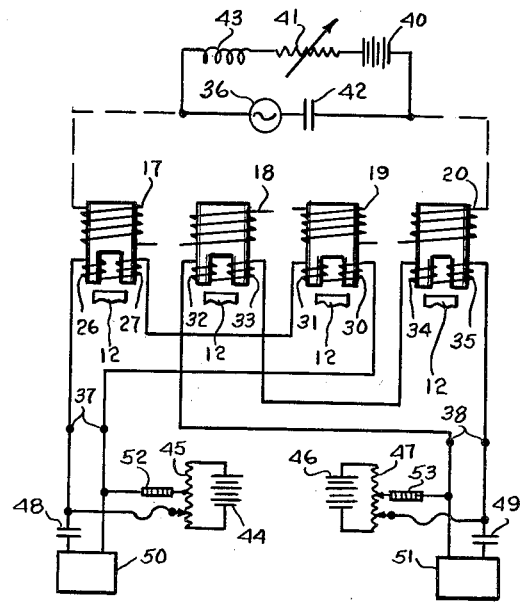
FIGURE 4 is a modificaiton of FIG. 3 showing D.C. torquing.

This pickoff coil arrangement can also be used to apply torques to the rotor 12 in order to extend the utility of gyro. FIGURE 4 shows a possible embodiment incorporating D.C. torquing as well as A.C. pickoff in the same coils. The main motor windings illustrated by 17, 18, 19, 20 are energized as in FIG. 3 by the A.C. power supply but in addition the coils 17, 18, 19, 20 carry a small direct current from battery supply 40, which in series with variable resistor 41 is connected across the coils 17–20. Capacitor 42 keeps the D.C. out of the A.C. generator while the choke 43 keeps the A.C. out of the battery circuit. The D.C. in the windings 17–20 establishes a small unidirectional flux as shown by the arrows in FIG. 4.

Pickoff torquer windings 26, 27, 30, 31 are also supplied with a direct current as from D.C. power supply 44 through potentiometer 45 which are connected across terminals, 37. Pickoff-torquer windings 32, 33, 34, 35 are also supplied with a direct current by a D.C. power supply 46 through potentiometer 47 which are connected across terminals 38.

Capacitors 48, 49 keep the D.C. out of the circuits 50, 51, which utilize the pickoff signals at terminals 37 and 38, while chokes 52, 53 keep the A.C. out of the battery circuits 44 and 46.

The direct component of the magnetic flux due to winding 17 in the fingers 22 and 29 can be increased by direct current of proper polarity through windings 26 and 31 while at the same time reducing the magnetic flux through the core fingers 23 and 28. Thus, the rim of wheel 12 will be attracted to the stronger field, i.e., towards fingers 22 and 29 resulting in a counterclockwise torque about the Y—Y axis, as viewed in FIGURE 2. For a clockwise torque the polarity of the excitation voltage for windings 26, 27, 30 and 31 is reversed.

Similarly, the energization of windings 32, 33, 34, 35 of proper polarity will apply a torque about the Z—Z axis in one direction or the other as devised, the magnitude of the torque depending on the strength of the direct current in the pick-off torque windings 32–35.

Figure 5:
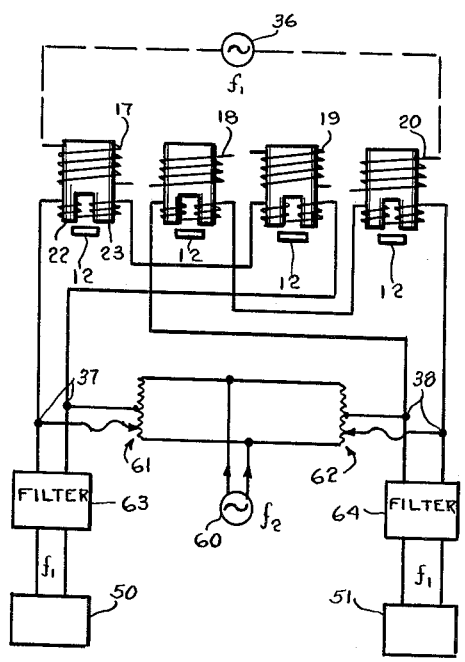
FIGURE 5 is a modification of FIG. 4.

It will be seen that in the D.C. torquing arrangement just described, the unidirectional magnetic flux acts to brake the rotor and thereby lowers the motor efficiency. For this reason, A.C. torquing may be preferred. FIGURE 5 illustrates an A.C. counterpart of the D.C. arrangement of FIG. 4 wherein the voltage output of torquing power supply 60 is applied through potentiometers 61, 62 to the terminals 37 and 38 of the pickoff coils. In order to keep the pickoff and torquing functions separated the frequency of generator 36 and frequency of the power supply 60 are different and preferably are not one of the lower harmonics of one another. For example the motor and pickoff excitation from generator 36 may be a 400 cycle per second voltage while the output of power supply 60 may be a 900 c.p.s. voltage. Band pass filters 63, 64 transmit only the 400 c.p.s. signals at terminals 37, 38 to the utilization devices 50 and 51 and eliminate the 900 c.p.s. signals from these devices. As in FIG. 4, the 900 c.p.s. signal from potentiometer 62, 62 reinforces the flux at one pole, e.g. 22, and diminishes the flux at the other pole, e.g. 23, resulting in the application of a torque couple to the rotor 12.

Nine hundred cycle power is not required in the main motor windings 17–20. The interaction of the magnetic flux due to the 900 c.p.s. excitation of the torquer windings 26a, 27a, 30a–35a with the main motor flux provides the attractive force which applies the desired torque to the gyro rotor.

Figure 6:
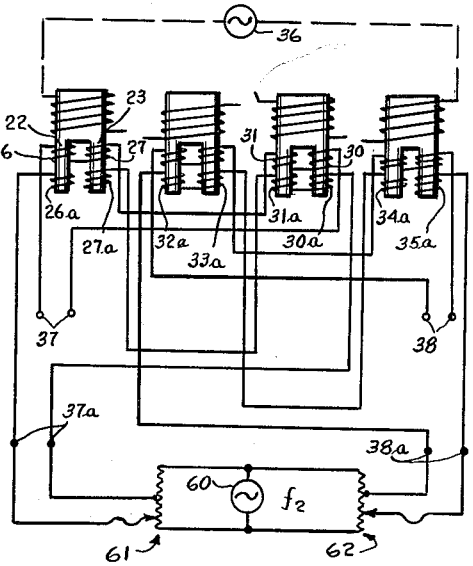
FIGURE 6 is a further modification of FIG. 4.

FIGURE 6 shows another possible embodiment wherein separate pickoff and torquer coils are wound on the motor stator. Thus, a torquer coil 26a and the pickoff coil 26 are wound on finger 22 while a torquer coil 27a and the pickoff coil 27 are wound on finger 23. Similarly, torquer coils 30a, 31a, 32a, 33a, 34a, and 35a are wound on the fingers carrying correspondingly identified pickoff coils 30–35. In this embodiment, the pickoff coils are connected across terminals 37 and 38 as in FIG. 3 and the torquer coils are connected across terminals 37a and 38a in a similar manner. The output of power supply 60 is applied across terminals 37a and terminals 38a through potentiometers 61 and 62 respectively to energize the torquing coils. The interaction between the main motor flux and the flux from the torquing coils results in an attraction of the hysteresis ring 12 toward the stronger field, and the application of a torque to the ring 12.

Figure 7:
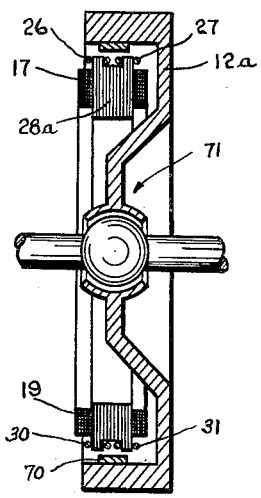
FIGURE 7 is a modification of FIG. 2.

FIGURE 7 shows a possible mechanical structure in which the rotor 12a surrounds the magnetic core 28a. The rotor 12a may carry a hysteresis ring 70, and is supported by the universal bearing 71. The magnetic core 28a carries the usual motor windings 17, 19 and the auxiliary windings 26, 27, 30, 31 as in the other embodiments described earlier.

None of the embodiments herein described should be considered as limiting the invention in any way since there are many other modifications which will occur to those skilled in the art and the scope of the invention should be determined only by the appended claims.

I claim:

1. In a device of the character described, an annular core, motor windings on said core, a pair of auxiliary windings on said core, said auxiliary windings being placed side by side along the length of said core.

2. In a device of the character described, an annular core, motor windings on said core, a pair of auxiliary windings on said core, said auxiliary windings being placed side by side along the length of said core, a second pair of auxiliary windings on said core placed diametrically opposite said first pair of auxiliary windings, said first and second pair of auxiliary windings being electrically connected in series.

3. In a device of the character described, an annular core, motor windings on said core, a pair of auxiliary windings on said core, said auxiliary windings being placed side by side along the length of said core, a second pair of auxiliary windings on said core placed diametrically opposite said first pair of auxiliary windings, said first and second pair of auxiliary windings being electrically connected in series, third and fourth pairs of auxiliary windings on said core placed at the extremities of a diameter perpendicular to the diameter joining said first and second pairs of auxiliary windings, said third and fourth pairs of auxiliary windings being electrically connected in series.

4. In a device of the character described, an annular core, motor windings on said core, a pair of pickoff windings on said core, said pickoff windings being placed side by side along the length of said core.

5. In a device of the character described, an annular core, motor windings on said core, a pair of pickoff windings on said core, said pickoff windings being placed side by side along the length of said core, a second pair of pickoff windings on said core placed diametrically opposite said first pair of pickoff windings, said first and second pair of pickoff windings being electrically connected in series.

6. In a device of the character described, an annular core, motor windings on said core, a pair of pickoff windings on said core, said pickoff windings being placed side by side along the length of said core, a second pair of pickoff windings on said core placed diametrically opposite said first pair of pickoff windings, said first and second pair of pickoff windings being electricaly connected in series, third and fourth pairs of pickoff windings on said core placed at the extremities of a diameter perpendicular to the diameter joining said first and second pairs of pickoff windings, said third and fourth pairs of pickoff windings being electrically connected in series.

7. In a device of the character described, an annular core, motor windings on said core, a pair of torquer windings on said core, said torquer windings being placed side by side along the length of said core, rotor means in the cylindrical opening in said core adapted for rotation about a longitudinal axis, an electrical power source, means for energizing said motor windings by said power source for rotating said rotor, a second electrical power source, means for energizing said torquer windings by said second electric power source for applying a torque to said rotor about an axis perpendicular to the axis of rotation.

8. In a device of the character described, an annular core, motor windings on said core, a pair of torquer windings on said core, said torquer windings being placed side by side along the length of said core, a second pair of torquer windings on said core placed diametrically opposite said first pair of torquer windings, said first and second pair of torquer windings being electrically connected in series, rotor means in the cylindrical opening in said core adapted for rotation about a longitudinal axis, an electrical power source, means for energizing said motor windings by said power source for rotating said rotor, a second electrical power source, means for energizing said torquer windings by said second electrical power source for applying a torque to said rotor about an axis perpendicular to the axis of rotation.

9. In a device of the character described, an annular core, motor windings on said core, a pair of torquer windings on said core, said torquer windings being placed side by side along the length of said core, a second pair of torquer windings on said core placed diametrically opposite said first pair of torquer windings, said first and second pair of torquer windings being electrically connected in series, third and fourth pairs of torquer windings on said core placed at the extremities of a diameter perpendicular to the diameter joining said first and second pairs of torquer windings, said third and fourth pairs of torquer windings being electrically connected in series, rotor means in the cylindrical opening in said core adapted for rotation about a longitudinal axis, an electrical power source, means for energizing said motor windings by said power source for rotating said rotor, a second electrical power source, means for energizing said torquer windings by said second electrical power source for applying a torque to said rotor about an axis perpendicular to the axis of rotation.

10. In a device of the character described, an annular core, motor windings on said core, a pair of pickoff windings on said core, said pickoff windings being placed side by side along the length of said core, rotor means in the cylindrical opening in said core adapted for rotation about a longitudinal axis, an electrical power source, means for energizing said motor windings by said power source for rotating said rotor, a second electrical power source, means for energizing said pickoff windings by said second electrical power source for applying a torque to said rotor about an axis perpendicular to the axis of rotation.

11. In a device of the character described, an annular core, motor windings on said core, a pair of pickoff windings on said core, said pickoff windings being placed side by side along the length of said core, a second pair of pickoff windings on said core placed diametrically opposite said first pair of pickoff windings, said first and second pair of pickoff windings being electrically connected in series, rotor means in the cylindrical opening in said core adapted for rotation about a longitudinal axis, an electrical power source, means for energizing said motor windings by said power source for rotating said rotor, a second electrical power source, means for energizing said pickoff windings by said second electrical power source for applying a torque to said rotor about an axis perpendicular to the axis of rotation.

12. In a device of the character described, an annular core, motor windings on said core, a pair of pickoff windings on said core, said pickoff windings being placed side by side along the length of said core, a second pair of pickoff windings on said core placed diametrically opposite said first pair of pickoff windings, said first and second pair of pickoff windings being electrically connected in series, third and fourth pairs of pickoff windings on said core placed at the extremities of a diameter perpendicular to the diameter joining said first and second pairs of pickoff windings, said third and fourth pairs of pickoff windings being electrically connected in series, rotor means in the cylindrical opening in said core adapted for rotation about a longitudinal axis, an electrical power source, means for energizing said motor windings by said power source for rotating said rotor, a second electrical power source, means for energizing said pickoff windings by said second electrical power source for applying a torque to said rotor about an axis perpendicular to the axis of rotation.

References Cited in the file of this patent
UNITED STATES PATENTS
2,948,155      Burkam _____ Aug. 9, 1960